(12) United States Patent
Fitzsimmons

(10) Patent No.: US 8,593,267 B2
(45) Date of Patent: Nov. 26, 2013

(54) INPUT/OUTPUT END POINT CONTROL FOR INTEGRATED TELECOMMUNICATIONS NETWORK SYSTEMS VOIP

(76) Inventor: Carl Fitzsimmons, Webster, NY (US)

( * ) Notice: Subject to any disclaimer, the term of this patent is extended or adjusted under 35 U.S.C. 154(b) by 0 days.

(21) Appl. No.: 13/456,276

(22) Filed: Apr. 26, 2012

(65) Prior Publication Data
US 2012/0207150 A1 Aug. 16, 2012

Related U.S. Application Data

(63) Continuation of application No. 11/838,476, filed on Aug. 14, 2007, now Pat. No. 8,189,507.

(60) Provisional application No. 60/822,292, filed on Aug. 14, 2006.

(51) Int. Cl.
G08B 5/22 (2006.01)
G08B 1/08 (2006.01)
H04W 4/00 (2009.01)
H04L 12/66 (2006.01)

(52) U.S. Cl.
USPC .............. 340/286.07; 340/539.12; 370/328; 370/338; 370/356

(58) Field of Classification Search
None
See application file for complete search history.

(56) References Cited

U.S. PATENT DOCUMENTS

| | | | | |
|---|---|---|---|---|
| 3,668,682 A * | 6/1972 | Barbee et al. | ............ | 340/286.07 |
| 6,002,932 A | 12/1999 | Kingdon et al. | | |
| 2004/0043766 A1 | 3/2004 | Sashihara | | |
| 2006/0214786 A1 * | 9/2006 | Bixler et al. | ............. | 340/539.12 |
| 2008/0018435 A1 * | 1/2008 | Brown | ..................... | 340/286.07 |

OTHER PUBLICATIONS

An Unofficial the Prosecution History as of Apr. 25, 2012 for U.S. Appl. No. 11/838,476, filed Aug. 14, 2007, Published May 8, 2008, as US-2008-0107258-A1; Inventor: Carl Fitzsimmons.

* cited by examiner

*Primary Examiner* — Melanie Jagannathan
(74) *Attorney, Agent, or Firm* — Duane C. Basch; Basch & Nickerson LLP

(57) ABSTRACT

Disclosed are systems and methods that enable expanded functionality for call control monitoring and control of external electrical/electromechanical devices using a telecommunication system.

8 Claims, 7 Drawing Sheets

CCM

SQL iCall – Room info database
Room,Date,Time,Light On, Light Flash. Etc
.
n

SQL iCall – Room to Mobile phone database
Room,Date,Time,Dn(s) to call.
.
n

IPCC iCall Application:
Receives calls from room.
Places call after looking up SQL info for DN.
Updates Light SQL table.
Appends activity to Room activity data table
Updates Room Light data table.

Each phone becomes and Agent for that room.
The script will update the room Activity & Light
info databases.
When the answering agent is done. The script
updates the light Database table.

Agents can go off hook and either
1. Call a room.
2. Make an outside call
3. Change the indicator lights of a room.

| Room | Call Light | Emer Light | Bell | Phone 1 | Phone 2 | Phone 3 | Phone 4 | Phone 5 | Phone 6 | Resident |
|------|------------|------------|------|---------|---------|---------|---------|---------|---------|----------|
| 120W | 0 | 0 | 0 | 4001 | 4002 | 4003 | 5001 | 5002 | 6464 | John Q Public |
| n | | | | | | | | | | |

FIG. 8

| Door | Latch State | Area Sensor | Access Light | E Light |
|------|-------------|-------------|--------------|---------|
| 12E | 0 | 0 | 0 | 0 |
| n | | | | |

FIG. 9

| Access ID | E-Mail Address | Directory Location | Department 1 | Department 2 | Department n |
|-----------|----------------|--------------------|--------------|--------------|--------------|
| ******** | email@yes | c:/ed/dept/ | item.txt | item.txt | item.txt |
| ******** | parent@email | c:/ed/dept/ | item.txt | item.txt | item.txt |
| ******** | parent1@inform | c:/ed/dept/ | item.txt | item.txt | item.txt |
| ******** | anotherparent@email | c:/ed/dept/ | item.txt | item.txt | item.txt |

INPUT/OUTPUT END POINT CONTROL FOR INTEGRATED TELECOMMUNICATIONS NETWORK SYSTEMS VOIP

This application is a continuation of, and claims priority from, U.S. patent application Ser. No. 11/838,476 for an "INPUT/OUTPUT END POINT CONTROL FOR INTEGRATED TELECOMMUNICATIONS-NETWORK SYSTEMS (VOIP)," by C. Fitzsimmons, filed Aug. 14, 2007, and also claims priority from U.S. Provisional Patent Application 60/822,292 for an "INPUT/OUTPUT END POINT CONTROL FOR INTEGRATED TELECOMMUNICATIONS-NETWORK SYSTEMS (VOIP)," by C. Fitzsimmons, filed Aug. 14, 2006, both of which are hereby incorporated by reference in their entirety.

BACKGROUND AND SUMMARY

Network, control and telecommunications systems at one time used separate infrastructures to perform the work they were designed for. This was needed but also costly to install, maintain and upgrade these systems for any organization.

Today however what once were desperate systems requiring separate infrastructures are now systems that use the same network communications infrastructure to connect to their respective devices. At the same time voice-over-internet-protocol (VoIP) telecommunications systems have presented to organizations that implement such systems with the potential for increased efficiency due to the simplification and integration capabilities of this VoIP system.

One important piece that needs to be addressed is exactly how can a VoIP telecommunications system actually control or become informed by a system that was never intended to be controlled or to inform any other system? Solving this problem would allow a VoIP system to demonstrate that their system does increase organizations efficiency. This same VoIP implementation would be a significant cost savings for any organization increasing the impact this system would have on any organization. This would increase the efficiency for organizations implementing such a system and reduce cost in other infrastructures that would be needed to provide the same functionality.

Examples of some of these other systems include:
1. Entrance and Exit Control through surveillance and actuator control at these egress/ingress points, such as Schools, Colleges, Municipal Buildings, Correctional Institutions (to indicate a Request to Enter or Exit, and/or to indicate someone passed this area).
2. Information Indicators and Alarms for Nursing Homes, Residence Rooms, Hospitals. For example, the operation of the system in accordance with the following disclosure could include a situation where a person places a call for a specific need, a light indicating the request is lit to visually indicate the need, a bell is set to audibly indicate the need, and the call is placed to an assigned phone(s). Next the call is picked up and answered, a determination to set a different light for an Emergency could remotely be decided. Similarly, any number of variations may be employed as defined by the need. Information indicators, lights, bells, buzzers/chimes, etc. may also find application in schools, colleges, municipal buildings and correctional institutions. Thus, the system may also be employed to indicate that a room needs assistance, and where different indicators could mean different reasons specific to this location.

Others have designed their own subsystem to integrate into the existing telecommunications systems. These subsystems are separate servers running separate applications still using a separate infrastructure, or they use older TDM, PBX subsystems. The integration capability of the Integrated Telecommunications/Networked VoIP systems are not fully utilized.

These Integrated Telecommunications/Networked VoIP systems use Ethernet, wireless, fiber etc. to connect each part together. These systems rely on integrated database subsystems for functionality. None integrates into the database subsystems to allow a Call Center Application from the telecommunications provider connected into this Ethernet system to directly control these Input/Output Devices.

These new integrated systems need to deliver to their customers what is "sold" as would happen as a result of the level of integration these systems provide. What was explained is that they would gain this increased flexibility that would enable the seamless integration and control of these other systems. This was touted as a cost savings and as of yet the full potential of this flexibility is left to subsystem developers and manufacturers. What is needed is a way to integrate the IO Control into these newly acquired systems that will deliver on the promise.

To assist in setting the context for the present disclosure, the existing capability of a telecommunications system (e.g. Cisco) will now be described. The Cisco Call Manager (CCM) has a Call Control server, whereby calls are recognized and directed to the requesting location. In accordance with an aspect of the disclosed system and method, an iCall script/program will be resident either on IPCC-Cisco Call Center or appropriate location to provide the functionality described herein. In other words, this script/program would need to reside on another server sold by the subsystem manufacturer. Calls presented to this server from CCM will be treated as needed. For example, the need will be defined by the Called Number and will be reflected in the work that the script/program performs. Fields in the Database are Set or Read and actions are performed as defined by the need.

For analog or IP phones the action may simply be to allow access to the outside world and to this iCall integration if that is the number called. Some phones may automatically request iCall when picked up (e.g., an emergency phone where no dialing is required). Applicant understands this is integration beyond what separate systems can presently offer.

Aspects of the present disclosed system and method (iCall) also supplement Cisco or other VoIP integrated system capability to interface to external IO devices. The following are some additional examples of such capabilities.

Intelligent IO Subsystem—This is the analog/digital input-output subsystem such as OPTO-22 SNAP Automation Controllers that interfaces with any and all end effectors, indicators or input devices that exist in any building. In one embodiment the Intelligent IO subsystem is a self-contained autonomous subsystem that interfaces to the Cisco AVVID or other VoIP system either through a wired or wireless connection currently used by this system. The interface mechanism is either through a database that may or may not be ODBC compliant or through a customized application that stores information that represents the state of any end effectors, indicators, output or input devices.

Database such as SQL, MySQL, etc or custom application such as Filemaker integration provides the ability to have the separate systems work together. This database or custom application integration is what allows these systems to work together—allowing for non-physically or logically connected systems to work together while sharing the same connection to the network. They perform work by polling for a change to the database or custom application and then perform an action when a state change is noticed or sends an update to the database or custom application as an end result of polling to update the state or to change the state of any end effectors, indicators, output or input devices.

The iCall system would also have the ability to control mechanisms (end effectors, indicators or input devices) to:

a. Select an action such as set a door lock to unlock a door;

b. Cancel an action such as release a door lock to lock a door.

c. Read an Output action request including, for example, once set by the database or custom application indicator or end effectors output state change as requested by IPCC, separate Application or other Call Center system to indicate or control a needed action such as turning a light on or off, turning a sound generating device on or off. Also included would be reading an input state change such as one identified by the Intelligent IO Subsystem where a state change would occur in the database or custom application and then read by the IPCC, separate Application or other Call Center system. For example, to indicate something passed in front of the detector.

The iCall may be operated with or under the control of a software application, program or script to logically integrate all of the components. Why is there value in a software program? One of the advantages of the iCall system is that the application, script or program and the IO environment resides in different locations. In such an embodiment the IPCC or other Call Center system is developed to produce a control algorithm designed for the control that is needed for this particular implementation. Such a control algorithm includes reads and writes to a newly created database or data container that was created for this purpose, and which may reside in either CCM, separate or IPCC servers. Moreover, the database application is the SQL server that exists on the Cisco server such as IPCC or CCM. This configuration is believed to provide a significant cost savings as it utilizes the existing SQL database that resides on either or both systems. Furthermore, flexibility is created due to the use of the existing database system that changes or reads the state of the external indicators, end effectors or input devices. Flexibility is further enhanced through the use of existing network infrastructure such as cabling, layer 3 or layer 2 network devices, which is a cost savings in itself. Although described relative to a Cisco system, the advantages and efficiencies set forth herein may be similarly achieved with other telecommunications systems.

The iCall system will further include Intelligent IO system or Modules as subsystems. This external sub system contains its own application, script or custom application to read from or write to the database or custom application. Therefore the integration of separate systems through the use of a database or external application allows uniquely different systems that were never designed to work together to be able to do just that. In one embodiment a program specific to this function will read and write data between the separate systems. In other words, the operating program will logically bind these two discrete and separate systems so they can work together. The disclosed system and method contemplates the program, residing in one or more portions of the system, including its own computer, the database, Call Manager, IPCC or IO controller.

Disclosed in embodiments herein is a system or method for expanding the functionality of a telecommunications system using atypical electrical and/or electromechanical devices, comprising: providing a plurality of electromechanical devices that are connected to either to an Intelligent IO device or slave to this Intelligent IO device and is accessible through the network via the logical interconnection which is updated and controlled by each separate system; assigning each electromechanical device an associated position (IP address) consistent with the desired implementation which is reflected in the database of the telecommunications system or other device that contains the database for this purpose; providing a database table reflecting the status of each electromechanical device; accessing the database upon detecting a change in state of the electromechanical device; and altering the performance of the electromechanical device by changing the state of the device in the database, said change being initiated by an operation performed in the telecommunications system.

DETAILED DESCRIPTION

The various embodiments described herein are not intended to limit the claimed invention to those embodiments described. On the contrary, the intent is to cover all alternatives, modifications, and equivalents as may be included within the spirit and scope of the appended claims.

The iCall system and method, as summarized above, can be used to control or to enable commercially available end effectors or input and output devices with a conventional telecommunications system. The devices that may be monitored or controlled include, but are not limited to, Door locks, Solenoids, Electro magnets, Lights (Low or High Voltage), other Visual indicators, Audible Indicators including Bells, Buzzers, etc., and Motors. This basic functioning will also work to open a door (Security Access etc), and/or turn on and off a light, buzzer, bell etc.

In one exemplary embodiment in a patient care facility (e.g., hospital, nursing home), the patient pulls the cord, hits the call button on the cord or wall panel. For example, a call manager (CCM) may include a Private Line Auto Ring-Down (PLAR) that automatically places calls. Controlled by the IP Call Center (IPCC) Program/Script, the system finds the Directory Number (DN) match of a room stored in SQL database. The telephones that need to be called for this room are then called in order, lights or audible devices are found and set accordingly in the database match. In one example the system may take the following actions:

(i) If No Answer then ring the next phone, then (ii) the Room Database is updated for lights, (iii) the Room Number, Date, Time, are appended to the days database; and (iv) an E-mail is sent out (Not in basic operation), and (v) the Main Contact phone is called.

In the embodiment, the External Master IO controller continually checks for status of the Room Database and updates itself and any other Sub IO controller for correct functioning of lights, audible devices and any other end effectors or device deemed important for this implementation. The controller also controls how the Components work together as stated in the Software program/script to logically integrate all of the components.

Figure 1:
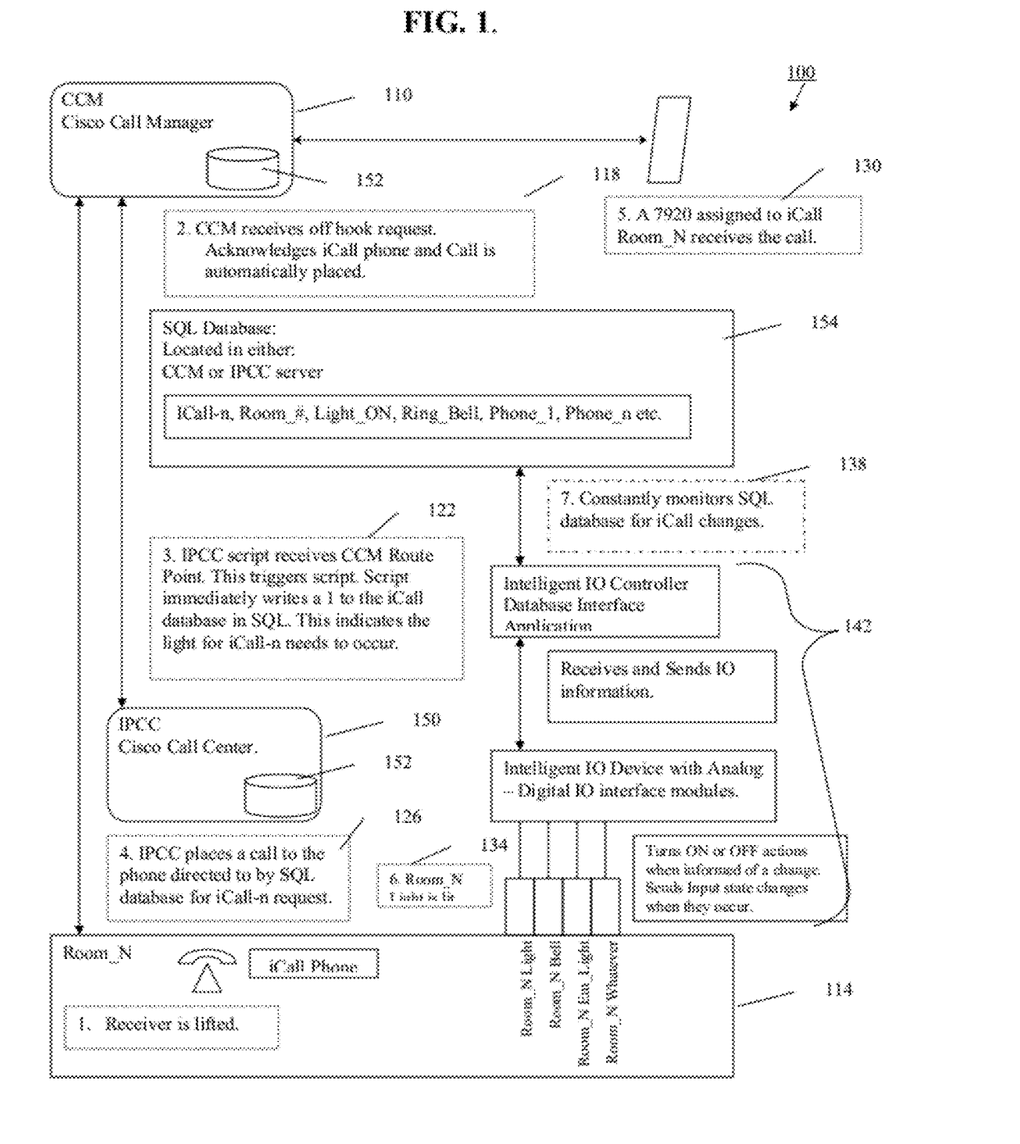
FIG. 1 is a flow diagram depicting the iCall functionality described herein, including the iCall logical flow with database connectivity.
Figure 2:
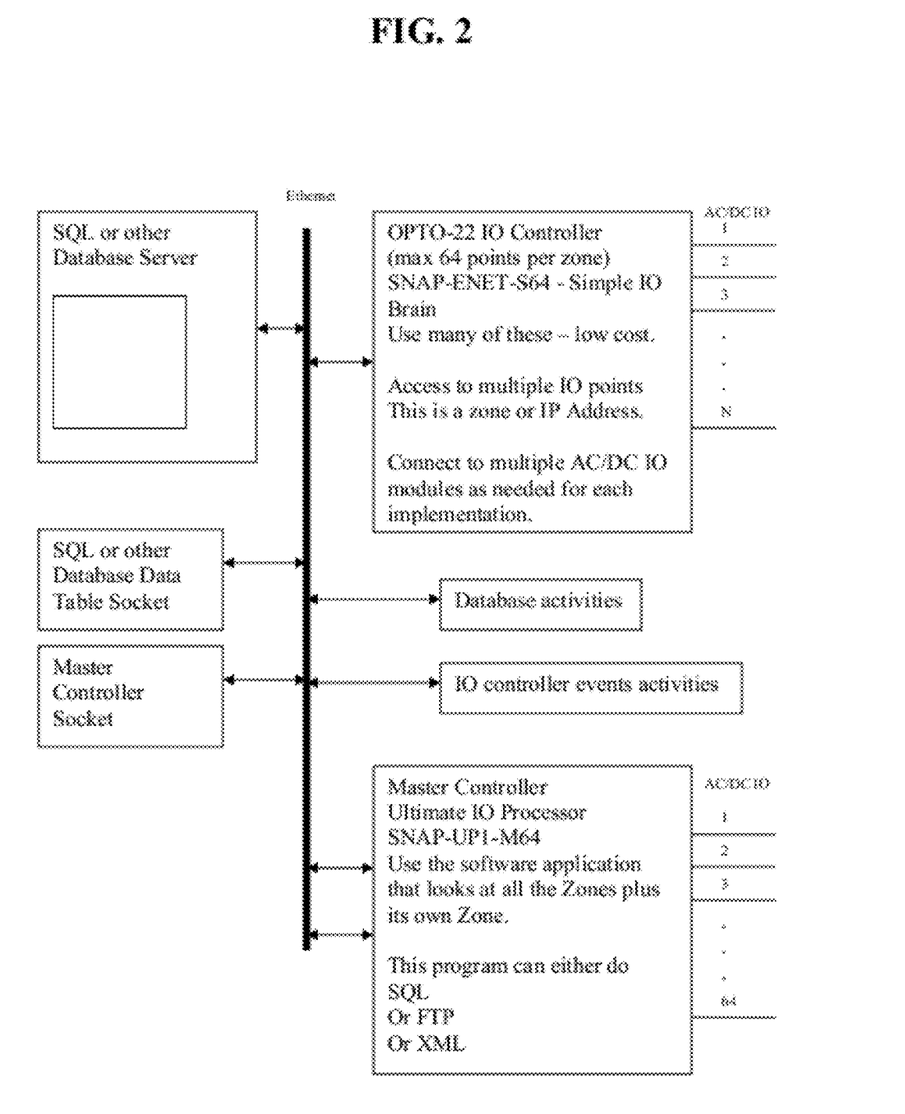
FIG. 2 is a schematic illustration of the components of a VoIP system integrated with an I/O control module in accordance with an aspect of the disclosed system and method.

Referring to the flowchart of FIG. 1, including the iCall system 100, the iCall process begins at Step 1, when a receiver is lifted in room N (114). Lifting the receiver on the room phone generates a signal to the Call Manager 110 that initiates a call. In the Call Manager, the signal (an off hook request 118) is received. The Call Manager acknowledges iCall phone identifies it as an PCC request and passes the call onto IPCC. IPCC searches the SQL database 154 to find this location and updates the database as needed for the function that needs to be performed. In addition, other actions may be initiated in response to the internet protocol call center (IPCC) 150 application/script, including for example lighting a light (see step 6 Room N light is lit) ringing a bell or chime, etc. The iCall script/program will be resident on the server and stored in memory 152. More specifically, as depicted in steps 4-7 (126, 130, 134, 138), the IPCC places a call as directed and the device assigned to iCall for room N receives the call (light turned on, audible device enabled etc.), and the system then returns to a monitoring mode for other changes to the system.

In one embodiment, the IPCC 150 is implemented using a script/program 122 that employs existing mnemonic structures in the Cisco AEF development module, that resides on the IPCC server or your computer, but only executes from the IPCC server to produce a control algorithm designed for the control that is needed. This may include reads and writes to a newly created database that was created for this purpose that will reside in either CCM or IPCC servers or other server. Furthermore, the database application may be the SQL server that exists on the Cisco server.

This is how the integration works with the existing CCM-IPCC servers. Moreover, the use of the database as a means to integrate the functionality of the iCall components with external systems (e.g., Cisco, Nortel, AVAYA, Sanyo or any other telecommunications providers) will allow further integration capabilities and demonstrates the flexibility these systems can provide. Developing a completely stand alone system would not create the flexibility and level of integration capable using the disclosed system. However this is exactly what telecommunications vendors do now. It is important to note that while the disclosed embodiments are described relative to a Cisco Communications platform, this same approach could be utilized in Nortel, AVAYA, Sanyo or any other telecommunications provider with a similar database organized and driven call control system. As described herein the iCall components work together as stated in software program/script to logically integrate all of the components as generally reflected in items 142 of FIG. 1.

Another feature of the iCall system is report generation. Daily or real-time (at the moment) reports can be viewed and saved using scripts developed in related software such as the Filemaker Pro application. Such reports can be employed to meet the requirements of licensing or certifying agencies such as state regulations for Nursing Homes or Care Facilities.

Integrated Call Control-Customer Response-Customer Control-Intelligent IO named definitions and uses include the following:

iCall—This integration can be used for Patient-Resident to Nurse or Health Care provider call request. It can also be used for Business Communications where an integration of immediate dialing integrated with Informative lights and or Sounds is needed or required.

iDoor—This integration is intended to integrate egress access control for Learning Institutions, Municipal Buildings or any other business or organization that needs integration of such devices.

iHotLine—This integration is intended to integrate the need for HotLine information to be E-Mailed or Spoken through the use of text files stored in a pre-determined location. This functionality could be used in schools as a Homework Hotline or in a Business. In either example, the caller is in need of information that is specific to that organization. Through the Script/Application the caller could select a voice response or email action once arriving at the needed information.

The iCall, iDoor, iHotLine or other defined applications that use Cisco Call Manager, Internet Protocol Call Center, Intelligent IO Controllers, IO Controlled Devices or Sub Modules Component or Sub Component information may be considered. For example, components such as Intelligent IO Controller, Cisco Call Manager or Internet Protocol Call Center can be placed in the same location or placed in appropriate locations provided that an Ethernet connection or appropriate connectivity between one another exists. In one embodiment, components such as the Sub Module will be placed as close as needed to IO Controlled Devices. Furthermore, IO Controlled Devices will be placed directly outside the room and in any location deemed appropriate for the information these devices are intended for.

As previously summarized above, the End Effectors may include, but are not limited to: lights, buzzers, bells, tone generators, solenoids, motors, presence/proximity sensors and other visual and audible devices as well as other electro-mechanical devices.

Referring again to FIG. 1, the following is a detailed description of the iCall process.

1. Person picks up the phone or pushes a request button or pulls the cord out of the socket or any action deemed necessary that would create a call.
   a. A call is placed to Cisco Call manager.
2. Cisco Call Manager acknowledges the call request:
   a. Routes request to IPCC (Cisco Internet Protocol Call Center)
3. The Internet Protocol Call Center receives call request from Cisco Call Manager.
   a. This call request triggers a specific script.
   b. This script sets all values to Integrated Database.
4. The Internet Protocol Call Center script:
   a. Reads the phone numbers from the database that need to be called for this request.
5. The phone that was identified in the database number is called:
   a. The personnel picks up the call or if no answer.
   b. Internet Protocol Call Center selects the next number to dial
   c. Until the last number is reached. This last number is equivalent to a number deemed to be the last call attempt and is of utmost importance to be answered. This is addressed by each organization, as they deem appropriate.
   d. This occurs whether the phone type is wireless, wired, VoIP or Analog.
6. The light at the specific location is tuned on.

a. The light location is placed outside the room or in the appropriately desired location as required for the need.
  i. If a Light, multiple Lights with or without Audible Indicators are required at this location they will be appropriately grouped together.
b. If this light is indicated to flash then the Sub Module will control this action without the need to look back into the Integrated Database.

7. Throughout all this time the Intelligent IO Controller is monitoring the database activity.
  a. When an update occurs the Intelligent IO Controller reads the change.
  b. This change is sent to the appropriate Sub Module.
    i. This Sub Module will contain another script/program that will control certain actions depending on the identified change.
      1. i.e.: If this update is to turn on a light and this light is defined as a flashing light then this Sub Module will control the Light ON-Light OFF sequence without further need from the Integrated Database. Further, the Light On-OFF duration is set at the database, which allows modification to this rate on a per device basis.
      2. This action continues until the Application/Script has completed its designed implementation.

iDoor process (FIG. 5)—includes all aspects of iCall except includes the use of a VT Advantage video camera(s) or other IP Video Camera(s).

Figure 5:
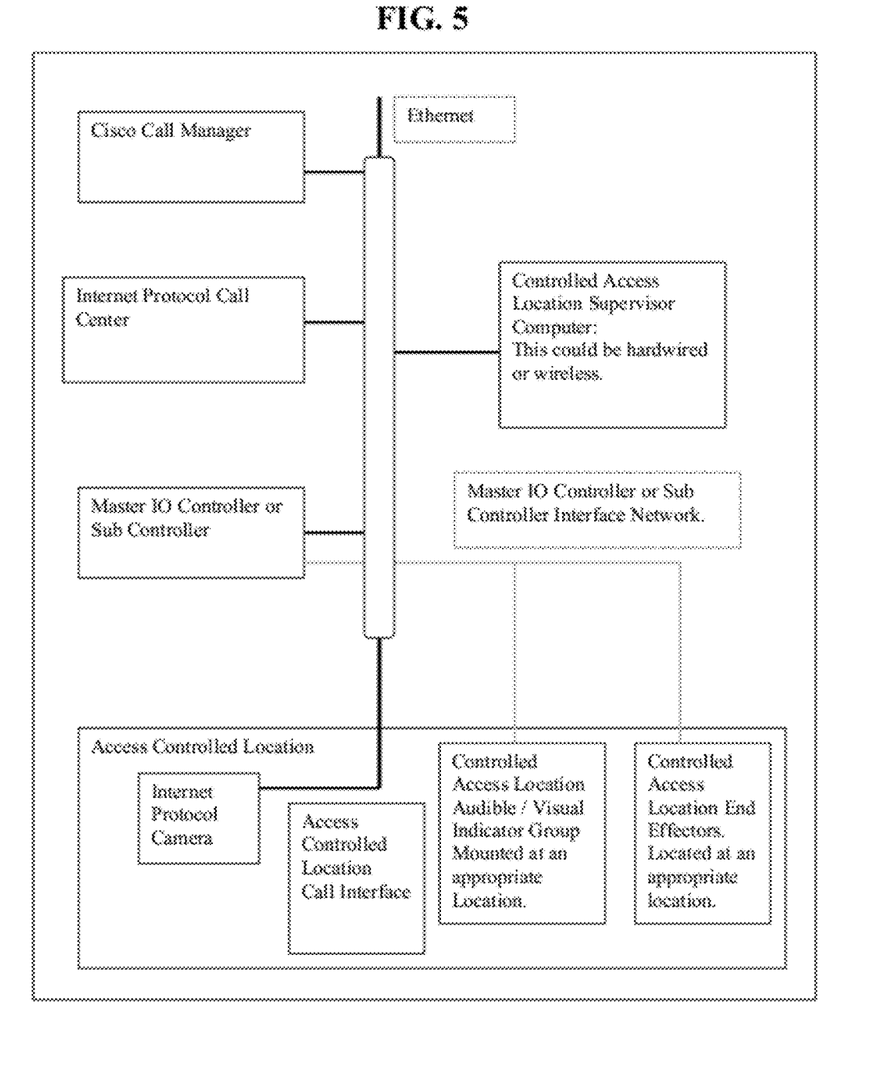
FIG. 5 is an exemplary illustration of the iDoor logical layout.
Figure 6:
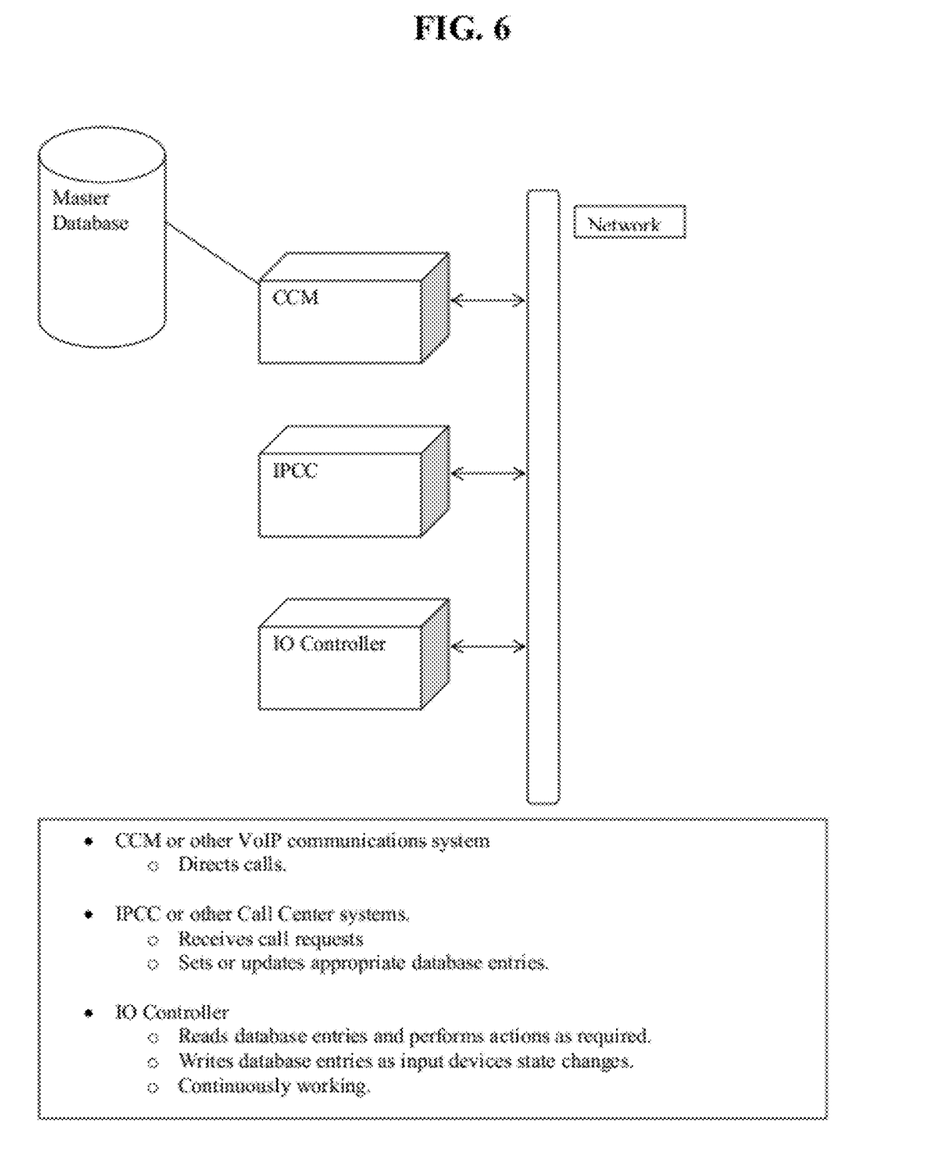
FIG. 6 is an illustrative example of the connectivity between components of an iCall embodiment.

1. A person arrives at a Controlled Access Location (interior or exterior) of a building/room.
2. The person requesting entrance pushes a button or picks up the receiver at the Controlled Access Location Access Request Terminal
3. Cisco Call Manager receives call request.
  a. Sends request to Internet Protocol Call Center.
4. Cisco Internet Protocol Call Center directs call to appropriate Script/Application.
  a. Integrated Database is read to gain indication of person at Controlled Access Location.
    i. Optional: if this system is so equipped.
5. A screen pops up at the designated Display Terminal.
  a. Screen pop up contains the live view of the person at the Controlled Access Location.
  b. Either a soft button will appear inside this screen pop or a separate screen pop with a soft button that when clicked will unlock that Controlled Access Location.
6. Person at this location decides if person can gain access.
  a. Yes: Selects soft Button displayed on computer Screen.
  b. No: Informs person they cannot enter.

iHotLine will enable any organization with the ability to use the Cisco Call Manager and Internet Protocol Call Center to form an Interactive Voice or e-Mail capability for identified documents.

Each Access ID is equivalent to One Relationship.
  i.e.: If this is to be used at a Learning Institution and more than one relationship (child) is at this location. Then there would be one Access ID per relationship. This allows direct relationship for this Adult to their child or children.

The following exemplary embodiment uses a School District as the example. For purposes of this example there are two parents that were given Access ID's for each of there two children. We will call this ID#1 and ID#2. The grade is immaterial as the Access ID's Integrated Database points to the appropriate location that contains the information associated for each child.

Initially, the integrated database was filled in with the appropriate information. What Teachers/Instructors or appropriate individuals will need to do is place a text file or other appropriately identified file that contains the actual information that they are responsible for in the correct location that day. The contents may be good for that day only or not. The Script/Program/Application and Integrated Database can be modified to allow more than a day's worth of information to be stored.

Script/Program Logical Flow:
1. An individual calls the school to obtain homework information for their child.
2. Cisco Call manager receives the call and sends to the Internet Protocol Call Center.
3. Internet Protocol Call Center recognizes the request and sends to appropriate Script/Application.
4. Script/Application asks for Access ID and password if required by that organization.
5. Upon successful input the Internet Protocol Call Center Script/Application asks caller if they want to hear the information or have this e-mailed.
  If the caller wants to hear the information then the Script/Application will access the item.txt and use Integrated Text to Voice to speak the information to this parent.
  If the caller elects E-mail, then they may be asked if they want all subjects or just one.
    a. If all was selected then they are all E-Mailed at that time.
      Further steps will take the Parent to exit or to other selections.
    b. If one was selected then further questions need to be asked and answered to indicate which one.
      When selected then this item.txt is E-Mailed.
      Further steps will take the Parent to exit or to other selections.

Further the number that called can be included in the e-mail for verification purposes.

Figure 9:
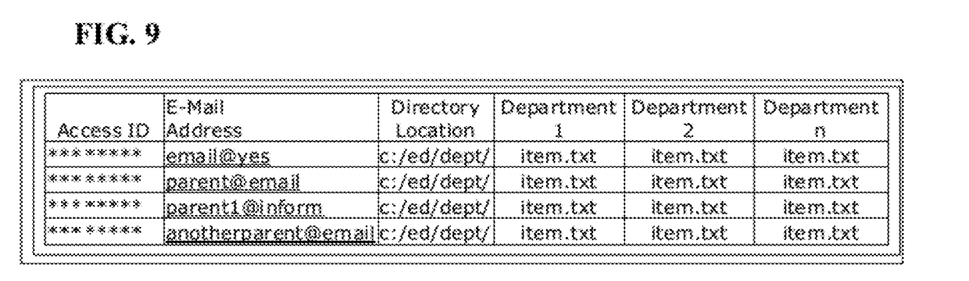
FIG. 9 depicts a typical database for an iHotline capability.

Using the example above, FIG. 9 provides an example of an iHotLine Integrated Database Layout. An exemplary database table layout for iHOTLINE is depicted where, for example, Department 1 could stand for Science Class and so forth.

The Script/Program is written to control and define the functionality required for the implementation required (e.g., Door Control, Light Control etc.). The SQL or other Database is designed and developed for this implementation. For example, in the iCall embodiment the database is (a) Defined to hold as many Row/Columns as needed for this implementation, (b) includes A Row that contains storage for iCall, includes columns that contain storage for as many Rooms as needed.

Figure 7:
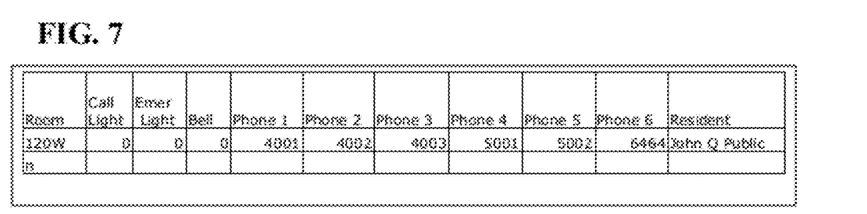
FIG. 7 illustrates an exemplary database table layout for iCall.

An exemplary database table layout for iCall is depicted in FIG. 7

Figure 8:
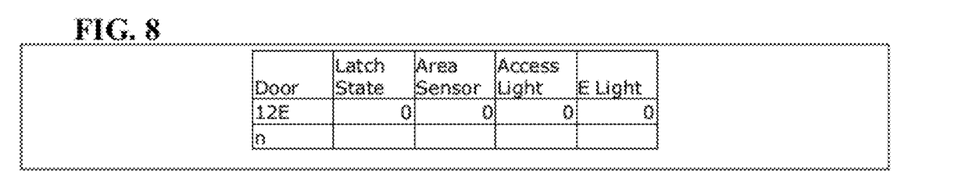
FIG. 8 depicts a typical database layout for iDoor.

Referring next to a typical database layout for iDoor as depicted in FIG. 8, the database is defined to hold as many Row/Columns as needed for this implementation. In one embodiment, a Row contains storage for iDoor, and the Columns contain storage for as many Rooms as needed.

As will be appreciated, the iCall phone is placed in Residents' rooms, and the iDoor phone is placed at appropriate door.

For the Intelligent IO Module, one possible implementation utilizes hardware such as that supplied by OPTO-22. The Master Controller, Ultimate IO Processor, SNAP-UP1-M64, use a software application that looks at all the zones plus its own zone. This program can either do SQL, FTP or XML. The OPTO-22 Controller, SNAP-ENET-S64, SNAPS-PACS, employ or will provide a simple IO brain such as the SNAP-ENET-S64. As will be appreciated use of many of these devices will allow the system to remain at a low cost. The intelligent IO Module will continually monitor the database that is updated by the Internet Protocol Call Center after certain external events are selected. When changes are identified by the script/application that this device is running, the appropriate change is made to the end devices (end effectors) that this system connects to.

To implement the system it is necessary to write a script/program in the available mnemonic/programming structure to perform needed actions, for example, control Buzzer period or control Light flashing period. The Database Module continually monitors for changes to database that would occur due to the Script/Program on the IPCC server or Update the Database due to an Input Sensor change.

In accordance with an embodiment described, the system includes a Separate Call Manager server with a database, a separate IPCC server, with specially developed script/application, writing to its database or to the Call Manager server, and a separate IO Control device with its own memory map of internal control locations. And, a program specific to this function will read and write data between these separate systems. This is what will logically bind these two discrete and separate systems so they can work together. This program can reside on its own computer, the database, Call Manager, IPCC or IO controller. Without the programmatic control integration would not be complete. Therefore, there are three main areas that need specific application development to allow integration to occur. "IPCC-IO Controller-Independent software application" all work together to accomplish the work. It will be further appreciated that the functions performed by the various devices described may, in alternative embodiments, be maintained separately, or may be combined in to provide alternative embodiments.

Figure 3:
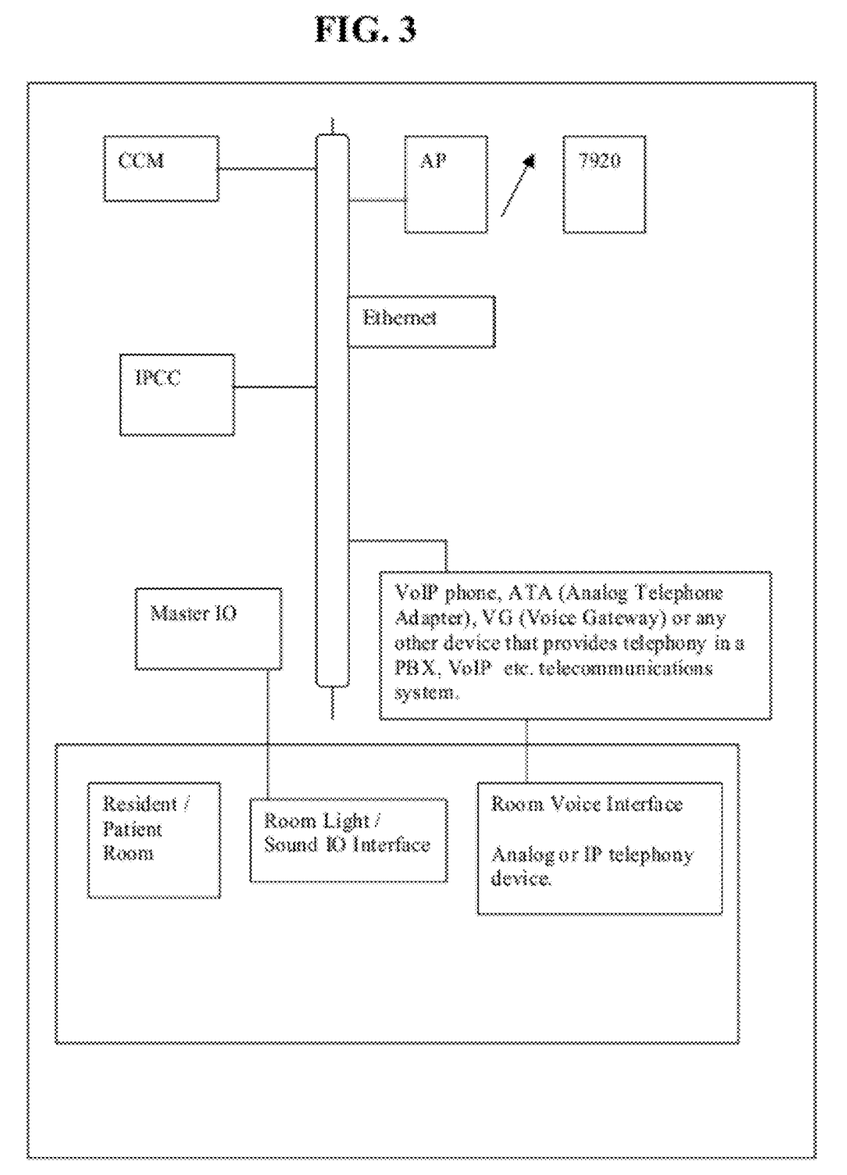
FIG. 3 is an illustrative example of the component layout and physical connections for the iCall functions described herein.

An exemplary integration layout is found in FIG. 3. This could be any IO Controller module that can interface into a SQL or other database.

Figure 4:
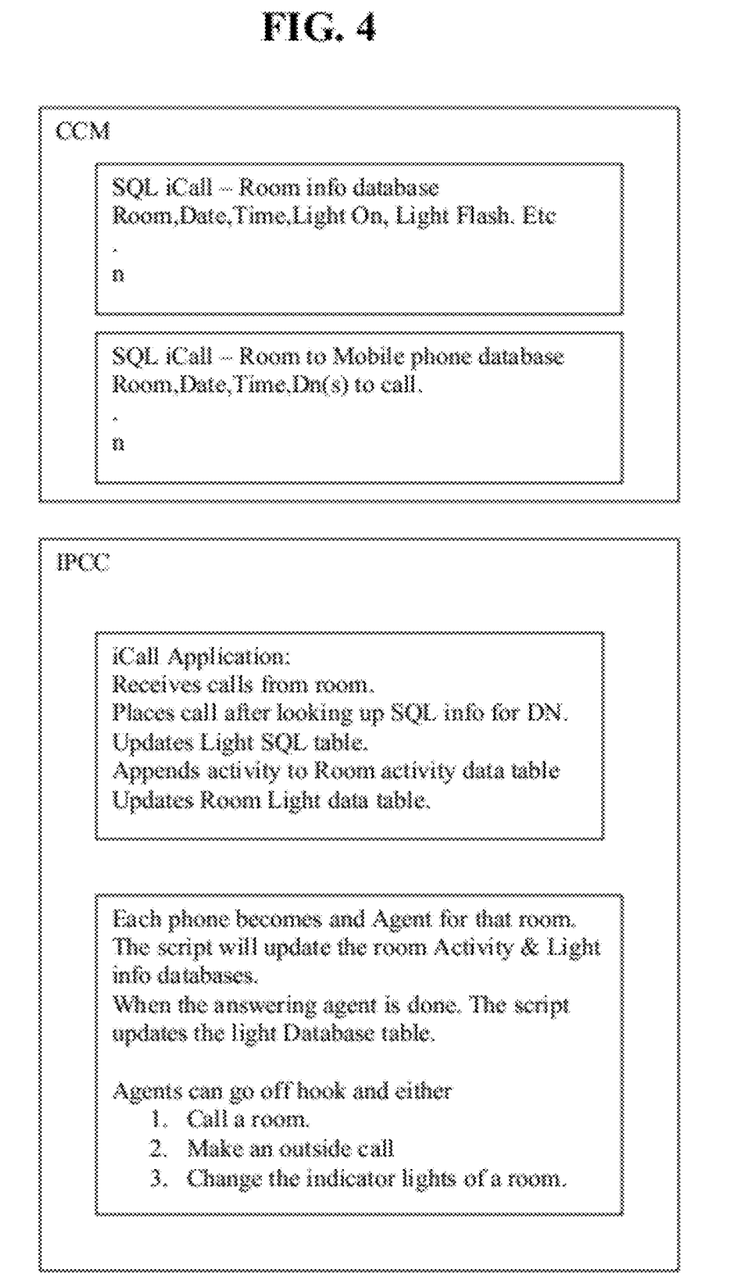
FIG. 4 is a general illustration of the architecture of an embodiment of the system and method disclosed herein.

Similarly, an exemplary component layout is depicted in FIGS. 3, 4. As noted previously, the component layout and physical network connections for iCall utilize traditional telecommunications interconnections to enable aspects of the disclosed embodiment. FIG. 5 is an exemplary illustration of the database integration when an embodiment is located on or implemented with a CCM server or other VoIP communications system.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A method for expanding the functionality of a networked communications system in a facility, comprising:
   providing a plurality of mechanisms that are not connected to the networked communications system, each of said mechanisms having an associated position within the facility;
   providing a database, said database including a table reflecting both the status and the associated position for each of the plurality of mechanisms;
   accessing the database upon detecting a change in state of at least one of the mechanisms; and
   altering the operation of at least one mechanism by changing the state of the at least one mechanism in the database, wherein said change of state of a mechanism in the database is initiated by an operation selected from the group consisting of: polling, flagging, signaling and interrupting.

2. The method according to claim 1, wherein at least one of said mechanisms is a sensor.

3. The method according to claim 1, wherein at least one of said mechanisms is selected from the group consisting of: end effectors, indicators and input/output devices.

4. The method according to claim 1, wherein altering the operation of at least one mechanism further comprises initiating action of a mechanism in response to a program, said program operating on the database to change the state of the mechanism as stored in the database.

5. The method according to claim 4, wherein altering the operation of at least one mechanism is initiated by a call on the networked communications system.

6. The method according to claim 1, further including automatically notifying at least one person of a change in state of at least one mechanism.

7. The method according to claim 1, further comprising indicating the state of the plurality of mechanisms, and permitting alteration of the state of at least one mechanism in the database to thereby control the operation of the mechanism manually.

8. The method according to claim 1 wherein a sensor alters the operation of the at least one mechanism by causing a change in the state of the mechanisms in the database as stored in the database in response to the sensor.

\* \* \* \* \*